2,893,961

PHOSPHORUS-CONTAINING POLYMERS

Robert J. McManimie, Dayton, Ohio, assignor to Monsanto Chemical Company, St. Louis, Mo., a corporation of Delaware No Drawing. Application November 18, 1955
Serial No. 547,838

12 Claims. (Cl. 260—2)

This invention relates to phosphorus-containing polymers. More particularly, it relates to polymers formed by the intramolecular rearrangement and polymerization of cyclic phosphite glycol esters and to a process for making the same.

It has been known hitherto to prepare polymers containing phosphorus as part of the polymer chain by the condensation of various phosphorus halides with other organic compounds, such as the condensation of a hydrocarbon-phosphonous dichloride or hydrocarbon-phosphonic dichloride with, for example, dihydroxy compounds or with olefins. However, these polymerization methods suffer from the usual disadvantages of condensation reactions which form hydrogen halides as a by-product, that is, that corrosive gases are evolved and must be removed from the reaction. Furthermore, in condensation reactions involving phosphorus-chlorine compounds, the resulting polymer may contain objectionable residual hydrolyzable chlorine radicals.

It is an object of the present invention to provide phosphorus polymers free of hydrolyzable chlorine. It is a further object of the present invention to provide a linear resinous polymer containing phosphorus atoms within the polymer chain. Another object of the present invention is a method of producing phosphorus-containing polymers which avoids the evolution of objectionable gaseous by-products.

These and other objects are realized by the catalytic polymerization of cyclic phosphite glycol esters.

The presently useful cyclic phosphite esters are of the formula

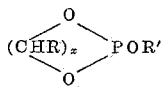

where $x$ is an integer of from 2 to 4, R is a radical free of non-benzenoid unsaturation containing only hydrogen, less than six carbon atoms, and less than two oxygen atoms, and R' is a hydrocarbon radical free of non-benzenoid unsaturation and containing from 1 to 8 carbon atoms.

By non-benzenoid unsaturation is here meant carbon-to-carbon, olefinic or acetylenic, unsaturation.

The cyclic phosphite esters which are of the above formula and which may be used in the present process for the production of phosphorus-containing polymers, are readily available, e.g., by the reaction of phosphorus trichloride with a glycol, followed by reaction of the resulting cyclic phosphorochloridite ester with an alcohol, or alternatively, by reaction of an ester of a phosphorochloridous acid with a glycol. The present phosphite cyclic esters may be conveniently named with reference to the glycols and alcohols from which they are derived. Thus, cyclic phosphite esters of trimethylene glycol which may be used in the present process may be listed, e.g., as methyl trimethylene phosphite, ethyl trimethylene phosphite, sec-butyl trimethylene phosphite, i-propyl trimethylene phosphite, amyl trimethylene phosphite, n-octyl trimethylene phosphite, phenyl trimethylene phosphite, phenethyl trimethylene phosphite, cyclohexyl trimethylene phosphite, etc. Presently useful alkylated alkylene glycol esters are, e.g., methyl propylene phosphite, ethyl propylene phosphite, n-propyl propylene phosphite, i-propyl propylene phosphite, n-butyl propylene phosphite, n-hexyl propylene phosphite, methyl tetramethylethylene phosphite, ethyl tetramethylethylene phosphite, n-butyl tetramethylethylene phosphite, the cyclic ester of 1,3-butanediol and methyl phosphite, the cyclic ester of 1,3-butanediol and ethyl phosphite, the cyclic ester of 1,3-butanediol and i-propyl phosphite, the cyclic ester of 1,3-butanediol and amyl phosphite, the cyclic ester of 1,3-butanediol and t-butyl phosphite, the cyclic ester of 2-methyl-1,3-propanediol and methyl phosphite, the cyclic ester of 2-methyl-1,3-propanediol and ethyl phosphite, the cyclic ester of 2-methyl-1,3-propanediol and butyl phosphite, etc. (By "propylene" hereinabove is meant the 1-methyl-1,2-ethylene radical, in accordance with Chemical Abstracts nomenclature.) Alkoxyalkylene glycol cyclic phosphite esters of the above formula and useful in the present process are, e.g., the cyclic ester of 3-methoxy-1,2-propanediol and methyl phosphite, the cyclic ester of 3-methoxy-1,2-propanediol and ethyl phosphite, the cyclic ester of 3-methoxy-1,2-propanediol and i-butyl phosphite, the cyclic ester of 3-methoxy-1,2-propanediol and n-hexyl phosphite, the cyclic ester of 3-methoxy-1,2-propanediol and 2-ethylhexyl phosphite, the cyclic ester of 3-methoxy-1,2-propanediol and p-tolyl phosphite, the cyclic ester of 3-ethoxy-1,2-propanediol and methyl phosphite, the cyclic ester of 3-ethoxy-1,2-propanediol and i-propyl phosphite, the cyclic ester of 3-ethoxy-1,2-propanediol and sec-butyl phosphite, the cyclic ester of 3-ethoxy-1,2-propanediol and n-octyl phosphite, the cyclic ester of 3-ethoxy-1,2-propanediol and phenyl phosphite, the cyclic ester of 3-ethoxy-1,2-propanediol and cyclohexyl phosphite, the cyclic ester of 3-methoxy-1,3-propanediol and ethyl phosphite, the cyclic ester of 3-methoxy-1,3-propanediol and i-butyl phosphite, the cyclic ester of 3-methoxy-1,3-propanediol and i-hexyl phosphite, etc.

Particularly preferred in the present process are the cyclic phosphite esters of the above formula wherein $x$ is an even number, i.e., 2 or 4, and R represents a hydrogen atom. Examples of such cyclic esters are the esters of ethylene glycol, such as methyl ethylene phosphite, ethyl ethylene phosphite, n-propyl ethylene phosphite, i-propyl ethylene phosphite, n-butyl ethylene phosphite, sec-butyl ethylene phosphite, t-butyl ethylene phosphite, n-octyl ethylene phosphite, phenyl ethylene phosphite, p-tolyl ethylene phosphite, benzyl ethylene phosphite, phenethyl ethylene phosphite, cyclohexyl ethylene phosphite, 2-cyclohexylethyl ethylene phosphite, etc.; and esters of 1,4-butanediol, such as methyl tetramethylene phosphite, ethyl tetramethylene phosphite, i-propyl tetramethylene phosphite, i-butyl tetramethylene phosphite, amyl tetramethylene phosphite, n-propyl tetramethylene phosphite, t-butyl tetramethylene phosphite, phenethyl tetramethylene phosphite, etc.

Catalysts useful in the polymerization of the present cyclic phosphite esters to produce polymers by the process of this invention are halogen-containing catalysts, such as Friedel-Crafts catalysts, and organometallic halides formed, e.g., by reaction of an alkyl halide with a metal which is capable of forming organometallic compounds, e.g., magnesium, aluminum, zinc, lead, tin, antimony, cadmium, gallium, germanium, tellurium, etc.

Preferred in the present process as catalysts are the Friedel-Crafts halide catalysts, such as the chlorides, bromides, or fluorides of aluminum, tin, zinc, magnesium, iron, titanium, bismuth, antimony, and of boron, etc.

The structure of the polymers produced by the present process is uncertain. Alkyl halides alone, in the absence of organometallic-compound-forming metals or Friedel-Crafts catalysts, have been found inoperative, under the present reaction conditions, in producing polymerization of the present cyclic phosphite esters, which suggests that the expected self-propagating Arbuzov isomerization-polymerization

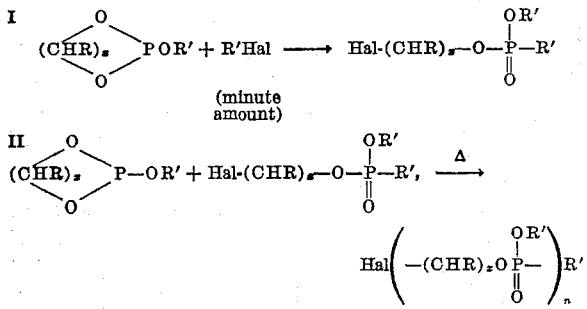

where Hal=halogen, $n$=a large integer and $x$, R, and R' are as defined above, does not proceed to any substantial extent, at least, in the absence of a catalyst. Thus, for example, no polymer was obtained when i-butyl ethylene phosphite was heated in a closed tube with catalytic amounts of i-butyl chloride, bromide, or iodide at gradually increasing temperatures of from 100° C. to 200° C., with intermittent cooling, for a total heating time of 39 hours. It is surprising, therefore, that polymers are formed by the present catalytic process.

On the other hand, when polymers were prepared in accordance with the present process, by heating a cyclic phosphite ester of the above formula with a halogen-containing catalyst, infra-red analysis showed that the resultant polymers contained P=O groups, which is indicative of the formation of pentavalent phosphorous in the products. While the infrared analysis of the polymers prepared as described below showed the presence of P—O—C groups, any absorption due to P—C bonds was obscured by bands due to other causes, so that it has been impossible to determine whether cleavage of the P—O bond or of the C—O bond in the present cyclic monomers is responsible for the polymerization. The alternative types of cleavage are illustrated by the following equations:

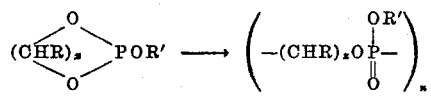

and

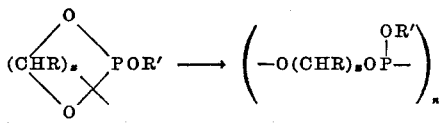

and/or

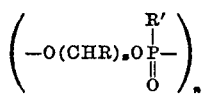

In addition to P=O and P—O—C bonds in the present polymers, it has been found by infrared analysis that the polymers produced by the present process may contain P—OH groups, and the residue from incomplete polymerization of a cyclic gylcol ester of an alkyl phosphite has been found to contain terminally unsaturated hydrocarbon, $CH_2=C<$. This indicates that a cleavage of the type

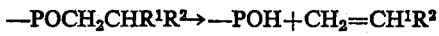

where $R^1$ and $R^2$ represent hydrogen, alkyl, cycloalkyl, or aryl radicals, in accordance with the definition of R' above, may take place in the course of the present reaction. It will be obvious that such cleavage is not possible with, e.g., phenyl or benzyl phosphite cyclic esters.

In carrying out the present process, the cyclic phosphite ester is simply contacted with the organometallic-compound-forming metal and alkyl halide or preformed organometallic halide or Friedel-Crafts halogen-containing catalyst at an elevated temperature until formation of the polymer has occurred. Amounts of catalyst may be, e.g., from 0.1% or less to 3.0% or more of the weight of the phosphorous acid ester. Mixtures of different cyclic esters may be copolymerized by the present process if desired. Solvents are generally undesirable in the present reaction, and the presence of water should be avoided, since the cyclic phosphite monomer is sensitive to hydrolysis. Advantageously, elevated temperatures, e.g., of from 100° to 300° C. are applied to accelerate the reaction. Preferred are temperatures of about 200° C., e.g., from 150 to 250° C. Conveniently, the polymerization may be carried out under pressure, so as to avoid loss of the reactants, though it is not excluded to operate at atmospheric pressure. Thus, for example, pressures of from 1.5 atmospheres up to 500 atmospheres or above may be applied during the polymerization. The process may be carried out in continuous fashion by suitable choice of equipment, or may be operated in batch fashion.

The invention is further illustrated but not limited by the following examples.

*Example 1*

Isobutyl ethylene phosphite

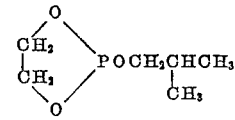

was prepared in accordance with the method of H. J. Lucas et al., J. Am. Chem. Soc. 72, 5491 (1950), by the reaction of 168.0 ml. of ethylene glycol with 137.39 g. of phosphorus trichloride in methylene chloride, followed by isolation of the resulting ethylene phosphorochloridite (265.1 g.) and reaction of this cyclic ester with 155.3 g. of isobutanol in anhydrous ether in the presence of 165.8 g. of pyridine. The isobutyl phosphite cyclic ester prepared by this reaction, after purification, weighed 136.3 g. and boiled at 74–75° C./15 mm..

A mixture of 0.0191 g. of aluminum chloride and 11.8 g. of isobutyl ethylene phosphite, containing 0.03 g. of isobutyl chloride, was held at 193–194° C. in a sealed Carius tube for 20 hours. There were obtained 5.9 g. of clear, transparent, solid polymer. A sample of the polymer was held for one hour in a low vacuum at 70° C. and then a portion was heated on an aluminum block. The material was found to soften at above 100° C.; at above 200° C. bubbling occurred and there remained a white solid, adherent to the block, which softened at 300° C. and discolored to brown at 340° C. The high-softening solid was water-soluble.

*Example 2*

A mixture of 11.8 g. of isobutyl ethylene phosphite and 0.0325 g. of aluminum chloride was heated at about 200° C. for some 48 hours. Substantially the entire reaction mixture was converted to a clear, transparent, water-white polymer.

*Example 3*

A mixture of 9.8 g. of isobutyl ethylene phosphite, containing 0.05 g. of isobutyl iodide, and 0.0125 g. of metallic magnesium was heated in a sealed tube at about 200° C. for 20 hours. Solid polymer was formed which was similar to that obtained as described in Example 1.

The present polymers are hard, water-white, clear solids which generally soften at about 100° C. All of the present polymers are characterized by exceptional non-inflammability. They may be used, for example, for the production of molded or extruded articles which are flameproof or they may be coated, e.g., onto textiles to impart fire-proof properties to the coated fabric. The present phosphorus-containing polymers of lower polymeric weight may also be used as plasticizers, e.g., for polyvinyl chloride. Some of the present polymers are water-soluble and may be used, e.g., to provide an airtight, easily-removed coating on metals. Other modifications and variations of the present invention will be obvious to those skilled in the art.

What is claimed is:

1. A linear resinous polymer containing phosphorus atoms within the polymer chain, obtained by heating at a temperature in the range of 100°–300° C. a cyclic phosphite ester of the formula

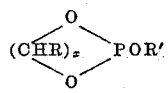

where $x$ is an integer of from 2 to 4, R is a radical free of non-benzenoid unsaturation, consisting of hydrogen, less than six carbon atoms, and less than two oxygen atoms, and R' is a hydrocarbon radical free of non-benzenoid unsaturation and containing from 1 to 8 carbon atoms, with a catalyst selected from the class consisting of monomeric organometallic halide catalysts and halogen-containing Friedel-Crafts catalysts which are the reaction products of magnesium and an alkyl halide, aluminum and an alkyl halide, zinc and an alkyl halide, lead and an alkyl halide, tin and an alkyl halide, antimony and an alkyl halide, cadmium and an alkyl halide, gallium and an alkyl halide, germanium and an alkyl halide and tellurium and an alkyl halide.

2. A linear resinous polymer containing phosphorus atoms within the polymer chain, obtained by heating at a temperature in the range of 100°–300° C. an ethylene glycol cyclic phosphite ester of the formula

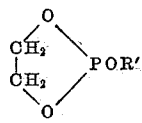

where R' is hydrocarbon radical free of non-benzenoid unsaturation and containing from 1 to 8 carbon atoms, with a catalyst selected from the class consisting of monomeric organometallic halide catalysts and halogen-containing Friedel-Crafts catalysts which are the reaction products of magnesium and an alkyl halide, aluminum and an alkyl halide, zinc and an alkyl halide, lead and an alkyl halide, tin and an alkyl halide, antimony and an alkyl halide, cadmium and an alkyl halide, gallium and an alkyl halide, germanium and an alkyl halide and tellurium and an alkyl halide.

3. A linear resinous polymer containing phosphorus atoms within the polymer chain obtained by heating at a temperature in the range of 100°–300° C. an alkyl ethylene phosphite cyclic ester of the formula

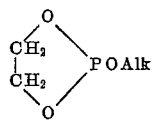

where Alk represents an alkyl group of from 1 to 8 carbon atoms, with a catalyst selected from the class consisting of monomeric organo-metallic halide catalyst and halogen-containing Friedel-Crafts catalysts which are the reaction products of magnesium and an alkyl halide, aluminum and an alkyl halide, zinc and an alkyl halide, lead and an alkyl halide, tin and an alkyl halide, antimony and an alkyl halide, cadmium and an alkyl halide, gallium and an alkyl halide, germanium and an alkyl halide and tellurium and an alkyl halide.

4. A linear resinous polymer containing phosphorus atoms within the polymer chain obtained by heating at a temperature in the range of 100°–300° C. an isobutyl ethylene phosphite cyclic ester of the formula

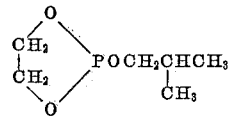

with a catalyst selected from the class consisting of monomeric organometallic halide catalysts and halogen-containing Friedel-Crafts catalysts which are the reaction products of magnesium and an alkyl halide, aluminum and an alkyl halide, zinc and an alkyl halide, lead and an alkyl halide, tin and an alkyl halide, antimony and an alkyl halide, cadmium and an alkyl halide, gallium and an alkyl halide, germanium and an alkyl halide and tellurium and an alkyl halide.

5. The process which comprises heating at a temperature in the range of 100°–300° C. a cyclic phosphite ester of the formula

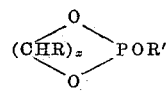

where $x$ is an integer of from 2 to 4, R is a radical free of nonbenzenoid unsaturation, consisting of hydrogen, less than six carbon atoms, and less than two oxygen atoms, and R' is a hydrocarbon radical free of non-benzenoid unsaturation and containing from 1 to 8 carbon atoms, with a catalyst selected from the class consisting of monomeric organometallic halide catalysts which are the reaction products of magnesium and an alkyl halide, aluminum and an alkyl halide, zinc and an alkyl halide, lead and an alkyl halide, tin and an alkyl halide, antimony and an alkyl halide, cadmium and an alkyl halide, gallium and an alkyl halide, germanium and an alkyl halide and tellurium and an alkyl halide, and halogen-containing Friedel-Crafts catalysts, and forming a linear resinous polymer containing phosphorus within the polymer chain.

6. The process which comprises heating at a temperature in the range of 100°–300° C. an ethylene glycol cyclic phosphite ester of the formula

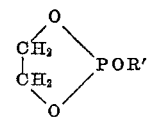

where R' is a hydrocarbon radical free of non-benzenoid unsaturation and containing from 1 to 8 carbon atoms, with a catalyst selected from the class consisting of monomeric organometallic halide catalysts which are the reaction products of magnesium and an alkyl halide, aluminum and an alkyl halide, zinc and an alkyl halide, lead and an alkyl halide, tin and an alkyl halide, antimony and an alkyl halide, cadmium and an alkyl halide, gallium and an alkyl halide, germanium and an alkyl halide and tellurium and an alkyl halide, and halogen-containing Friedel-Crafts catalysts and forming a linear resinous polymer containing phosphorus within the polymer chain.

7. The process which comprises heating at a temperature in the range of 100°–300° C. an alkyl ethylene phosphite cyclic ester of the formula

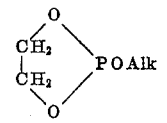

where Alk represents an alkyl group of from 1 to 8 carbon atoms, with a catalyst selected from the class consisting of monomeric organometallic halide catalysts which are the reaction products of magnesium and an alkyl halide, aluminum and an alkyl halide, zinc and an alkyl halide, lead and an alkyl halide, tin and an alkyl halide, antimony and an alkyl halide, cadmium and an alkyl halide, gallium and an alkyl halide, germanium and an alkyl halide and tellurium and an alkyl halide, and halogen-containing Friedel-Crafts catalysts and forming a linear resinous polymer containing phosphorus within the polymer chain.

8. The process which comprises heating at a temperature in the range of 100°–300° C. an isobutyl ethylene phosphite cyclic ester of the formula

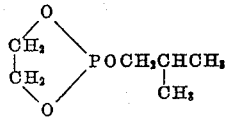

with a catalyst selected from the class consisting of monomeric organometallic halide catalysts which are the reaction products of magnesium and an alkyl halide, aluminum and an alkyl halide, zinc and an alkyl halide, lead and an alkyl halide, tin and an alkyl halide, antimony and an alkyl halide, cadmium and an alkyl halide, gallium and an alkyl halide, germanium and an alkyl halide and tellurium and an alkyl halide, and halogen-containing Friedel-Crafts catalysts and forming a linear resinous polymer containing phosphorus within the polymer chain.

9. The process which comprises heating at a temperature in the range of 100°–300° C. an isobutyl ethylene phosphite cyclic ester of the formula

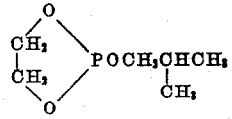

with a halogen-containing Friedel-Crafts catalyst and forming a linear resinous polymer containing phosphorus within the polymer chain.

10. The process which comprises heating at a temperature in the range of 100°–300° C.. an isobutyl ethylene phosphite cyclic ester of the formula

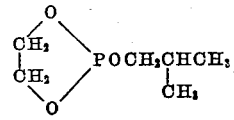

with aluminum chloride, and forming a linear resinous polymer containing phosphorus within the polymer chain.

11. A process which comprises heating at a temperature in the range of 100°–300° C. an isobutyl ethylene phosphite cyclic ester of the formula

with a monomeric organometallic halide catalyst which is a reaction product selected from the class consisting of magnesium and an alkyl halide, aluminum and an alkyl halide, zinc and an alkyl halide, lead and an alkyl halide, tin and an alkyl halide, antimony and an alkyl halide, cadmium and an alkyl halide, gallium and an alkyl halide, germanium and an alkyl halide and tellurium and an alkyl halide, and forming a linear resinous polymer containing phosphorus within the polymer chain.

12. A process which comprises heating at a temperature in the range of 100°–300° C. an isobutyl ethylene phosphite cyclic ester of the formula

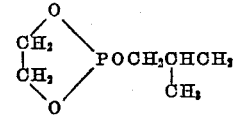

with metallic magnesium and isobutyl iodide, and forming a linear resinous polymer containing phosphorus within the polymer chain.

References Cited in the file of this patent
UNITED STATES PATENTS 2,382,622   Fon Toy _____ Aug. 14, 1945

FOREIGN PATENTS 843,753   Germany _____ July 14, 1952

OTHER REFERENCES

Lucas et al.: J. Am. Chem. Soc. 72, 5491 (1950).

UNITED STATES PATENT OFFICE
CERTIFICATION OF CORRECTION

Patent No. 2,893,961

July 7, 1959

Robert J. McManimie

It is hereby certified that error appears in the above numbered patent requiring correction and that the said Letters Patent should read as corrected below.

Column 3, lines 45 to 48., the first formula should appear as shown below instead of as in the patent:

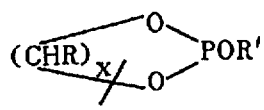

same column 3, line 70, the third formula should appear as shown below instead of as in the patent:

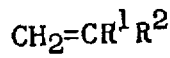

column 5, lines 25 to 31, lines 46 to 52, lines 66 to 73, and column 6, lines 10 to 16, strike out "which are the reaction products of magnesium and an alkyl halide, aluminum and an alkyl halide, zinc and an alkyl halide, lead and an alkyl halide, tin and an alkyl halide, antimony and an alkyl halide, cadmium and an alkyl halide, gallium and an alkyl halide, germanium and an alkyl halide and tellurium and an alkyl halide", and insert the same after "catalysts" in column 5, line 24, column 5, line 45, and column 6, line 9, and after "catalyst" in column 5, line 65; column 8, line 27, for the last "$CH_2$" group read -- $CH_3$ --.

Signed and sealed this 23rd day of May 1961.

(SEAL)
Attest:

ERNEST W. SWIDER
Attesting Officer

DAVID L. LADD
Commissioner of Patents